United States Patent
Bahrs et al.

(10) Patent No.: US 8,099,711 B2
(45) Date of Patent: Jan. 17, 2012

(54) SYSTEM AND METHOD FOR MULTI-LEVEL SECURITY FILTERING OF MODEL REPRESENTATIONS

(75) Inventors: Paul J. Bahrs, Springfield, VA (US); Peter C. Bahrs, Georgetown, TX (US); Kevin J. Cornell, Stittsville (CA); Steven V. Hovater, Portsmouth, NH (US); Enrique V. Kortright, Thibodaux, LA (US); Fred M. Mervine, Ukiah, CA (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/970,959

(22) Filed: Jan. 8, 2008

(65) Prior Publication Data
US 2009/0178019 A1 Jul. 9, 2009

(51) Int. Cl.
G06F 9/44 (2006.01)
(52) U.S. Cl. ...................................................... 717/105
(58) Field of Classification Search .................... 717/105
See application file for complete search history.

(56) References Cited

U.S. PATENT DOCUMENTS

| | | | |
|---|---|---|---|
| 5,765,153 A | 6/1998 | Benantar et al. | |
| 7,991,788 B2 * | 8/2011 | Dettinger et al. | 707/783 |
| 2003/0058277 A1 * | 3/2003 | Bowman-Amuah | 345/765 |
| 2003/0084341 A1 | 5/2003 | Ramachandran et al. | |
| 2003/0095145 A1 * | 5/2003 | Patrizio et al. | 345/764 |
| 2004/0059611 A1 | 3/2004 | Kananghinis et al. | |
| 2006/0031833 A1 | 2/2006 | Huang et al. | |
| 2006/0117388 A1 | 6/2006 | Nelson et al. | |
| 2007/0124579 A1 | 5/2007 | Haller | |
| 2007/0157311 A1 | 7/2007 | Meier et al. | |
| 2008/0222734 A1 * | 9/2008 | Redlich et al. | 726/26 |

FOREIGN PATENT DOCUMENTS

| | | |
|---|---|---|
| WO | WO 97/33241 | 9/1997 |
| WO | WO 03/012584 A2 | 2/2003 |
| WO | WO 2004/100094 A2 | 11/2004 |
| WO | WO 2005/052720 A2 | 6/2005 |
| WO | WO 2006/091726 A2 | 8/2006 |

OTHER PUBLICATIONS

"XML Access Control Language (XACL)", Cover Pages, Feb. 10, 2001, http://xml.coverpages.org/xacl.html, 8 pages.
"[news.eclipse.tools.emf] Re: security", Apr. 23, 2007, http://dev.eclipse.org/newslists/news.eclipse.tools.emf/msg23284.html, 3 pages.

* cited by examiner

*Primary Examiner* — Philip Wang
(74) *Attorney, Agent, or Firm* — Stephen J. Walder, Jr.; David A. Mims, Jr.

(57) ABSTRACT

A system and method for multi-level security filtering of model representations. Elements of an architecture and systems engineering model have associated security characteristics identifying the required level of security that a user must have in order to be able to obtain access to information about that element of the model. Based on these security characteristics and the security level of a user attempting to access the model, the content of the model is modified such that elements that are not accessible by a user having that security level are obscured or not visible to the user. The other elements of the model which are accessible by the user based on his/her security level are modified in the modified model so as to not provide information that would disclose the nature, character, or in some cases even the presence, of the elements that are not accessible by the user based on his/her security level.

20 Claims, 10 Drawing Sheets

|  | MODEL ELEMENT TYPE 1 | MODEL ELEMENT TYPE 2 | MODEL ELEMENT TYPE 3 |
|---|---|---|---|
| MODEL ELEMENT TYPE 1 | RID 1.1.-ASSOCIATION<br>RID 1.1.2-DEPENDENCY | RID 1.2.1-ASSOCIATION<br>RID 1.2.2-COMMUNICATION | RID 1.3.1-COMMUNICATION |
| MODEL ELEMENT TYPE 2 | RID 2.1.1 - INHERITANCE | RID 2.2.1-COMMUNICATION | RID 2.3.1-DEPENDENCY |
| MODEL ELEMENT TYPE 3 | RID 2.3.1 - OWNERSHIP | RID 2.3.2-DEPENDENCY | -NA- |
| ⋮ | ⋮ | ⋮ | ⋮ |

*FIG. 4*

| 520 | RID 1.1.1 | RID 1.1.2 | RID 2.1.1 |
|---|---|---|---|
| BLACK BOX | ASSOCIATION RULE | COMMUNICATION RULE | INHERITANCE RULE |
| HIDDEN | RULE | RULE | REMOVAL AND REMOVAL OF DEPENDENTS |

*FIG. 5*

|  | INSTANCE OF MODEL ELEMENT 1 "SECRET" | INSTANCE OF MODEL ELEMENT 2 "TOP SECRET" | INSTANCE OF MODEL ELEMENT 3 "NONE" |
|---|---|---|---|
| INSTANCE OF MODEL ELEMENT 1 "SECRET" |  | COMMUNICATION |  |
| INSTANCE OF MODEL ELEMENT 2 "TOP SECRET" | INHERITANCE |  |  |
| INSTANCE OF MODEL ELEMENT 3 "NONE" |  | DEPENDENCY |  |

*FIG. 6*

- CASE 1-
  - A: for a relationship between elements M1 and M2 or
  - B: for a relationship between elements typed by M1 and M2 respectively
  - The case where User has sufficient security level (security) and the security labels on the model elements are the same.
    - U1.security == M1.security == M2.security → No change to models
  - The case where User has sufficient security level and the labels on the model elements differ
    - (U1.security >= M1.security AND U1.security >= M2.security) AND
    - M1.security != M2.security → No change to models
  - The case where User has sufficient security level for one model element but not the other
    - U1.security >= M1.security AND U1.security < M2.security →
    - //expand to use Black Box or Hidden Box technique, Link M1 to M2's links, remove (blackbox or hidden) M2
      - if (BLACKBOX)
          replace B with BLACKBOX model element, preserving all links
      - if (HIDDEN) {
          For each element K that M2 has a relationship with {
              Lookup in Potential Model Relationship table to see if we can create a link between M1 and K
                  If so, update the model link between M1 and K
          }
          Now we can remove M2

*FIG. 7*

- CASE 2 – stand alone model elements: M1

- User.security >= M1.security- ==> no change to models

- User.security < m1.security ==>
    if (BLACKBOX)
        replace M1 with BLACKBOX model element
    if (HIDDEN)
        remove M1

- CASE 3 – for containing group of model elements

- User.security >= G1.security →
    - no change to group
    - //but elements in group need to be checked
    - For each element K in G1 {
            Recursive: Apply Case 1, Case 2 or Case 3 on K
      }
- User.security < G1.security →
    - //remove entire group, regardless of lower security elements in G1
    - Apply Case 1 or Case 2 to G1
    - if (BLACKBOX)
            replace G1 with BLACKBOX model element
    - if (HIDDEN)
            remove G1

FIG. 9

SYSTEM AND METHOD FOR MULTI-LEVEL SECURITY FILTERING OF MODEL REPRESENTATIONS

BACKGROUND

1. Technical Field

The present application relates generally to an improved data processing system and method. More specifically, the present application is directed to a system and method for providing multi-level security filtering of model representations.

2. Description of Related Art

A systems architecture framework is a mechanism by which to specify how to organize and present the fundamental organization of a system embodied in its components, their relationships to each other, and to the environment and the principles guiding the system's design and evolution. Many different standards have been developed for defining such systems architecture frameworks.

The Department of Defense (DoD) of the United States (U.S.) government, for example, has developed the DoD Architecture Framework (DODAF) which defines a standard way to organize an enterprise architecture or systems architecture into complementary views. All major U.S. government DoD weapons and information technology system procurements are required to develop and document an architecture using the views prescribed in the DoDAF. While it is clearly aimed at military systems, DoDAF has broad applicability across the private, public, and voluntary sectors around the world and represents only one of a large number of systems architecture frameworks. DoDAF is especially suited to large systems with complex integration and interoperability challenges and provides unique "operational views" detailing the external customer's operating domain in which the developing system will operate.

Similar to DoDAF, the United Kingdom (UK) Ministry of Defense has developed the UK Ministry of Defense Architectural Framework (MODAF). MODAF, which is built on DoDAF, defines a standardized way of conducting enterprise architecture and provides a means to model, understand, analyze, and specify strategy, acquisition, capabilities, systems, systems of systems, and services. The purpose of MODAF is to provide a rigorous system of systems definition when procuring and integrating defense systems. More information about MODAF may be found at www.modaf.org.uk.

A new international OMG open standard, referred to as the Unified Modeling Language (UML) Profile for DoDAF/MODAF (UPDM), provides an industry standard representation for Architecture Framework Models (including DoDAF and MODAF) through the OMG standardization process based on a model-driven architecture (MDA) approach to specification. UPDM is built on UML and Systems Modeling Language (SysML). More information about UPDM may be found at http://syseng.omg.org/UPDM.htm.

Within these systems architecture frameworks, modeling languages are often used to represent the models of a particular concept, organization and/or system. For example, the Unified Modeling Language (UML), officially defined by the Object Management Group (OMG), is often used to provide models of organizations and systems. UML is a standardized general purpose modeling language that includes a graphical notation used to create an abstract model of a system, referred to as the UML model. In UML 2.0 there are 13 types of diagrams that are supported. These 13 types of diagrams are categorized as structure diagrams, behavior diagrams, and interaction diagrams.

The structure diagrams emphasize what things must be in a system being modeled. The structure diagrams include a class diagram, component diagram, composite structure diagram, deployment diagram, object diagram, and package diagram. The behavior diagrams emphasize what must happen in the system being modeled. Behavior diagrams includes an activity diagram, state machine diagram, and use case diagram. Interaction diagrams, which are a subset of behavior diagrams, emphasize the flow of control and data among the things in the system being modeled. Interaction diagrams include a communication diagram, interaction overview diagram, sequence diagram, and UML timing diagram.

Various types of applications and user interfaces have been developed to aid users in generating such models of systems and organizations using modeling languages such as UML. Typically, these applications and user interfaces have a graphical aspect as well as many different types of interfaces for obtaining and inputting information about the various objects and entities in the various diagrams of the UML model. For example, Rational Software Architect (RAS), available from the Rational Software division of International Business Machines Corporation, of Armonk, N.Y., provides a comprehensive modeling and development environment that leverages UML for creating architected C++ and Java2 Enterprise Edition (J2EE) applications and web services. Rational Software Architect is built on the Eclipse open-source software framework and includes capabilities focused on architectural code analysis, C++, and model driven development (MDD) with UML for creating resilient applications and web services.

While such tools provide users with an excellent way in which to develop applications using a MDD approach, their implementation in environments where security of information contained within the models, such as in DoD environments, may be less than desirable. That is, UML models, developed by or accessed by such tools, are typically represented by structured documents, such as Extensible Markup Language (XML) documents or the like. Once a user is able to access the XML documents, the user is able to access all of the information for the various objects and models contained within that structured document. Thus, there is no ability to provide fine tune control of security within a UML model of a system. It is an all or nothing approach, i.e. the user is either able to access the entire model of the system or is not able to access any of the information in the UML model. This can be troublesome in environments, such as the DoD, where many different levels of security access are required and various individuals of different security levels may be working on the same system or project.

In an effort to provide additional granularity for controlling access to XML documents, the Extensible Access Control Markup Language (XACL) was proposed. XACL is a declarative access control policy language implemented in XML along with a processing model describing how to interpret the policies set forth using the access control policy language. XACL allows XML documents to be defined in such a way that access the XML documents may be controlled based on access control policies and access levels assigned to users. While XACL allows for simply hiding entire elements of the XML documents, XACL does not provide mechanisms to control elements, mechanisms to identify relationships between elements, or mechanisms to perform replacement or substitution of elements.

SUMMARY

The illustrative embodiments provide a system and method for multi-level security filtering and transformation of model representations. With the system and method of the illustrative embodiments, elements of an architecture or systems engineering model have associated security characteristics identifying the required level of security that a user or system (referred to collectively herein as a "user") must have in order to be able to obtain access to information about that element of the model. Based on these security characteristics and the security level of a user attempting to access the model, the content of the model, i.e. the elements, their properties, their connections, their relationships, and other information within the model, is dynamically modified such that elements that are not accessible by a user having that security level are obscured or not visible to the user. Moreover, the other elements of the model which are accessible by the user based on his/her security level are modified in the dynamically modified model so as to not provide information that would disclose the nature, character, or in some cases even the presence, of the elements that are not accessible by the user based on his/her security level. In this way, a customized architecture or systems engineering model may be dynamically generated or transformed from a defined model based on security levels of users accessing the defined model.

Alternatively, various versions of the architecture or systems engineering model may be generated for the various supported security levels. For example, an original model may be defined that includes objects, packages, and/or other elements/constructs of an architecture or systems engineering model that have associated security characteristics of various security levels. From this original model, a first version of the model may be generated for a first user security level, or below, by transforming the original model into a customized model for the first user security level. Similarly, a second version of the model may be generated for a second user security level. The various versions of the original model may be stored in a secured system, i.e. a secured server or storage system, and may be retrieved based on the determined security level of the user requesting access to the original model.

The manner by which the original model may be transformed, either dynamically in response to a user request, or a priori and retrieved in response to a user request, may take many different forms. In one illustrative embodiment, transformation rules are established for various model element types and relationships between the various model element types. These transformation rules may make use of one or more data structures that define relationships between elements in the original model. These transformation rules may be applied to the actual elements and relationships between elements in a model based on a determined security level of a user attempting to access the model.

In one illustrative embodiment, a first data structure is provided that specifies the kinds of relationships that can occur between the various modeling language element types supported by the modeling language. Each of these relationships in the first data structure has an associated unique identifier that may be referenced by replacement/transformation strategies specified in a second data structure. Thus, the first data structure has, for each pairing of model element types, one or more relationship types with unique identifiers for identifying each relationship type that applies to that pair of model elements. The second data structure specifies a desired strategy for replacing relationships between model elements, based on a user selection of a desired representation mode, e.g., hidden or removed, for the modified versions of the model, as determined by a unique identifier corresponding to the relationships defined in the first data structure. Thus, in one illustrative embodiment, the second data structure specifies the way in which a relationship between two model elements should be modified or replaced if one of the elements is to be hidden or removed based on the permissible relationships specified in the first data structure.

The first and second data structures may be general in nature such that they apply to all transformations of an original model and may in fact apply to various different models generated using the same modeling language. The first and second data structures may be used to generate and/or configure data structures specific to a particular original model. That is, a particular original model may be analyzed to determine the various instances of the model element types. These instances of model element types may be used to generate a third data structure. That is, the third data structure may be generated by traversing the original model and identifying the actual relationships between model elements, their containment, hierarchy, and other architectural or structural characteristics of the original model. Using these three data structures, transformation rules may be established for transforming model elements and/or their relationships with other model elements in the original model into a modified model based on security characteristics and user security levels. These transformation rules may then use the various data structures to determine how to modify the model such that information about model elements that have a security characteristic indicative of a user not being able to access information about that model element is obscured or removed from a modified model and thus, the representation of the modified model through any model generation/editing tool.

In one illustrative embodiment, a method is provided for modifying an original model based on a security level of a user. The method may comprise receiving a user request for access to the original model, identifying a security level associated with the user, and comparing the security level of the user with security characteristic information of one or more model elements within the original model. The method may further comprise modifying the original model based on results of the comparison and application of one or more transformation rules for transforming the original model into a modified model based on the security level of the user and presenting the modified model to the user in response to the user request for access to the original model. The original model may be, for example, a Unified Modeling Language (UML) model generated using the UML profile for DoDAF/MODAF (UPDM) standard.

Modifying the original model based on results of the comparison and one or more transformation rules may comprise determining a representation option for the original model. The representation option may identify a manner by which elements in the original model that are transformed by the one or more transformation rules are represented in the modified model. The modified model may have a representation different from a representation of the original model, based on the representation option and the one or more transformation rules.

The representation option may be at least one of a black box representation option or a hidden element representation option. In response to a determination that the representation option is a black box representation option, elements of the original model having security characteristic information indicating a required security level higher than the security level of the user may be replaced with a black box representation in the modified model that does not provide details of the elements. In response to a determination that the representation option is a hidden representation option, elements of the original model having security characteristic information indicating a required security level higher than the security level of the user may be removed from a representation of the modified model. Moreover, in response to a determination that the representation option is a hidden representation option, user edits to elements of the modified model coupled, in the original model, to hidden elements in the modified model may be prohibited.

Modifying the original model based on results of the comparison and application of one or more transformation rules for transforming the original model into a modified model based on the security level of the user may comprise retrieving a previously modified version of the original model associated with the security level of the user in response to receiving the user request for access to the original model. Presenting the modified model to the user may comprise presenting the previously modified version of the original model.

Determining a representation option for the original model may comprise automatically determining a representation option for each element of the original model based on a determined difference in the security level of the user and a required security level specified in security characteristic information associated with the element.

Presenting the modified model to the user may comprise presenting the modified model to the user via a model editing engine. The modified model may prevent the user from accessing information about elements of the original model for which the user does not have a required security level. Via the modified model, the user may be able to access information about elements of the original model for which the user has a required security level.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an exemplary diagram of a general modeling language element type relationships table data structure in accordance with one illustrative embodiment;

FIG. 5 is an exemplary diagram of a relationship replacement table data structure in accordance with one illustrative embodiment;

FIG. 6 is an exemplary diagram of an actual model element relationships table data structure in accordance with one illustrative embodiment;

FIG. 7 is an exemplary diagram of a set of transformation rules for a first type of relationship between model elements in accordance with one illustrative embodiment;

FIG. 8 is an exemplary diagram of a set of transformation rules for a second type of relationship, in which the model element is a stand-alone model element, in accordance with one illustrative embodiment;

FIG. 9 is an exemplary diagram of a set of transformation rules for a third type of relationship, in which groups of model elements are contained, in accordance with one illustrative embodiment;

DETAILED DESCRIPTION OF THE ILLUSTRATIVE EMBODIMENTS

The illustrative embodiments provide a system and method for adding multi-level security to models in a data processing environment. Such data processing environments may include a single computing device or a distributed data processing environment in which multiple computing devices are in communication with one another via one or more data networks. Because of the security aspects of the illustrative embodiments, the mechanisms of the illustrative embodiments are especially well suited for a distributed data processing environment in which one or more client computing devices may access one or more server computing devices in order to obtain data, applications, and the like.

Figure 1:
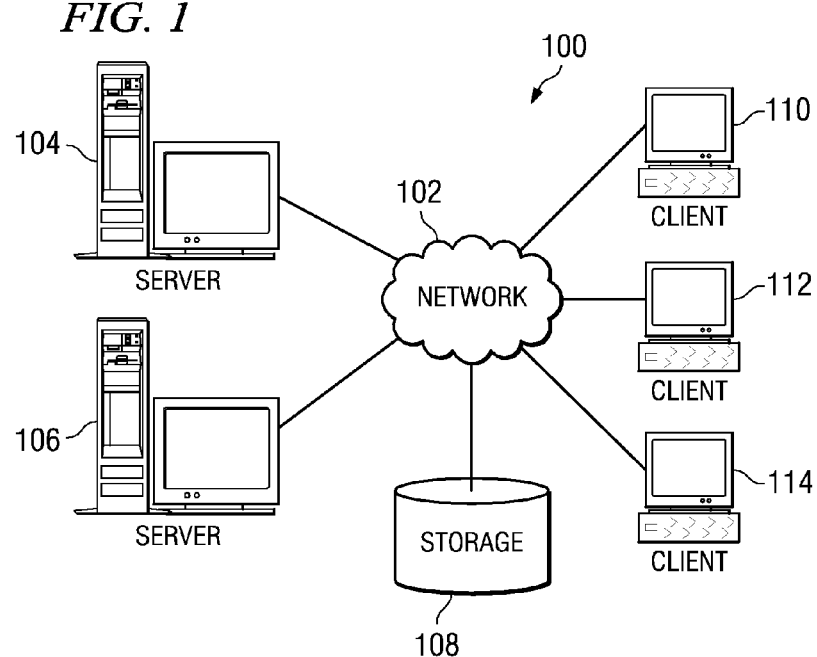
FIG. 1 is an exemplary representation of an exemplary distributed data processing system in which aspects of the illustrative embodiments may be implemented.
Figure 2:
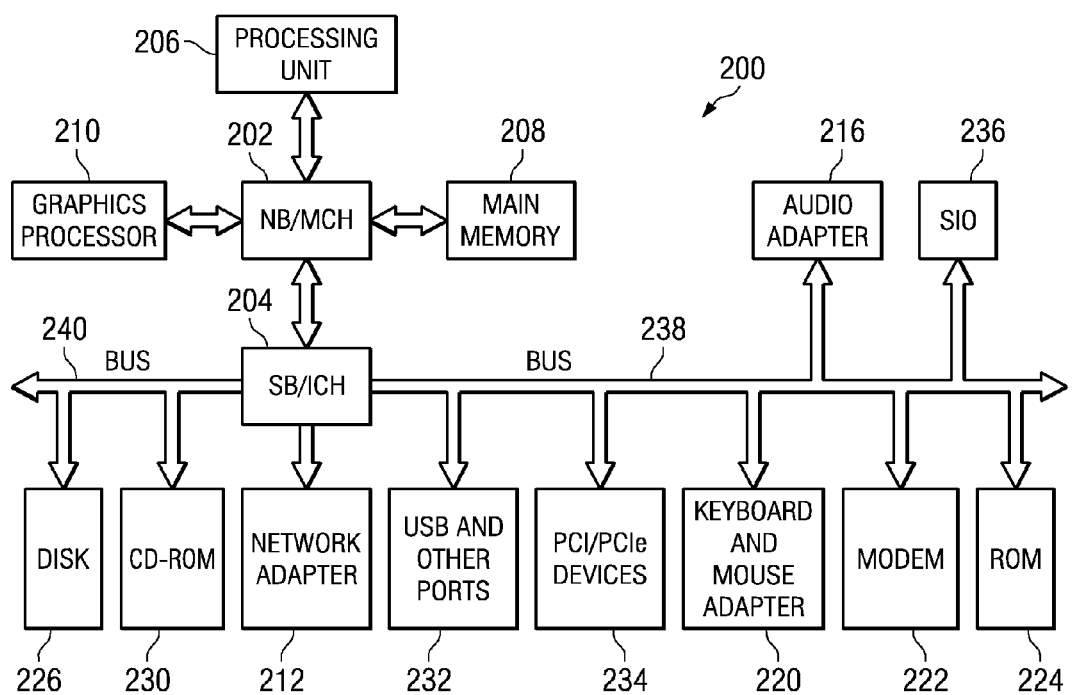
FIG. 2 is a block diagram of an exemplary data processing system in which aspects of the illustrative embodiments may be implemented.

FIGS. 1-2 are provided hereafter as a general description of examples of data processing environments in which the aspects of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage system 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Returning to FIG. 1, the illustrative embodiments provide a system and method for multi-level security filtering of model representations. With the system and method of the illustrative embodiments, a server or stand-alone computing device may provide an architecture and systems engineering modeling tool through which an architecture and systems engineering model may be defined and edited for representing an architecture in a systems architecture framework. Specifically, with regard to one preferred embodiment, the server or stand-alone computing device may provide tools for generating, viewing, and editing architecture and systems engineering models using the Unified Modeling Language (UML) Profile for Department of Defense Architecture Framework/Ministry of Defense Architectural Framework (DoDAF/MODAF) (UPDM) standard to thereby generate a UML model.

While UPDM and UML models will be referenced in the description of the illustrative embodiments hereafter, it should be appreciated that the mechanisms of the illustrative embodiments may be applied to any architecture and systems engineering modeling language and standard without departing from the spirit and scope of the present invention. Moreover, the following description assumes a distributed data processing environment in which client computing devices communicate with one or more servers via one or more data networks. However, it should be appreciated that the functionality attributed to the one or more servers may, in some illustrative embodiments, be implemented within a stand-alone computing device without departing from the spirit and scope of the present invention.

Assuming a distributed data processing environment, a server, such as server 104, may operate as a secured repository server which may provide architecture and systems engineering modeling tools as well as access to model data having security sensitive information. For example, the models, e.g., UML models, may represent a system of a branch or agency of the United States Department of Defense (DoD), with portions of the system having different security classifications, e.g., unclassified, classified, secret, top secret, etc. The models themselves may be stored in a secure repository, such as storage system 108, but may be accessed via the secure repository server 104, for example.

Preferably, in accordance with the mechanisms of the illustrative embodiments, the objects, packages, and other elements/constructs of the models in the secure repository have attributes including a security characteristic attribute defining the security level of the element. Such a security characteristic attribute identifies the required security level of a user for the user to access information about that element and/or view that element in user interfaces of the architecture and systems engineering modeling tools. This security characteristic attribute information may be used with transformation rules, algorithms, and/or policies to transform an original model into a modified model that is customized for a particular security level of a user. Such transformations may be performed dynamically in response to a user request for access to the original model or may be performed a priori with various versions of the original model being stored for retrieval when a user with a particular security level attempts to access the model.

A user of a client computing device, such as client computing device 110, may log onto the secure repository server 104 using a log on user interface and process as is generally known in the art, e.g., providing a user name and password. The log-on information may be verified with a user directory, such as a Lightweight Directory Access Protocol (LDAP) directory or the like, which may further store information about the security level assigned to that user. This security information may then be used, in response to the user of the client computing device 110 attempting to access models in the secure repository, to customize the model returned to the client computing device 110 to the security level of the user. This customization may involve dynamically modifying the original model requested by the user or retrieving a previously stored version of the original model that is associated with the particular user's security level. Alternatively, in another illustrative embodiment, the original model to which access is requested may be returned to the client computing device 110 along with information for modifying the original model in a representation provided by the client computing device 110 to the user, based on a comparison of the user's security level with the security characteristic attributes of the original model's elements.

The original model may be transformed by the application of transformation rules, algorithms, and/or policies based on established replacements of elements and/or relationships according to a selected representation option. That is, a developer of a model or other privileged user may specify the manner by which elements of a model having a higher security level than that of a user attempting to access the element may be represented to the user in a modified model. For example, in one illustrative embodiment, a privileged user may specify that either a 'black box' representation in which higher security level elements are replaced with black boxes and relationship information may be obscured in the modified model, or a "hidden" representation in which elements having higher security levels than the user are completely removed along with their relationships with other elements from the modified model, is to be used in modifying the original model.

Alternatively, the particular type of representation, e.g., "black box" or "hidden", may be automatically selected based on a difference in security level of the user with a required security level for accessing the element information. For example, if an element has a security characteristic attribute of "top secret" and the user has a security level of "secret," then a "black box" representation may be used such that the user is able to determine that an element is present but is not able to access specific information about that element. However, if the user's security level is only "unclassified", then a "hidden" representation may be used such that the user is not provided with any information identifying the presence of the element at all within the original model. Such automatic determination of representations for elements may be performed, for example, as a default setting or as a setting that supersedes the privileged user's designation of a desired representation for secured elements that a user is not able to access.

Based on a determined manner for representing the secured element, relationships with other elements that may be accessed by the user may be automatically modified according to the transformation rules, algorithms, policies, etc., so as to reflect the modification to the secured element. In this way, a modified model is generated for presentation to the user of the client computing device 110. The modified model is a fully functional model from the viewpoint of the user and thus, can be examined, edited, and otherwise manipulated by the user to the extent of their access as determined by their security level. Thus, the user is not able to obtain information about the secured elements for which they do not have adequate security level and are not able to modify those elements or the relationships between other elements and the secured elements. However, the user is able to modify the model with regard to other elements and relationships for which they have adequate security level access.

Thus, the illustrative embodiments provide a mechanism by which architecture and systems engineering models of organization and/or systems architectures may be modified based on a user's security level and the security characteristic attributes of the various model elements. Therefore, rather than only having an all-or-nothing approach to access of a model, the illustrative embodiments provide mechanisms for customizing the models for the various security levels of users so that the models themselves are modified to obscure or eliminate elements for which a user does not have an adequate security level. The resulting modified model is able to be edited and manipulated by the user with modeling tools with regard to the remaining elements in the model that have not been obscured or removed by the mechanisms of the illustrative embodiments.

Figure 3:
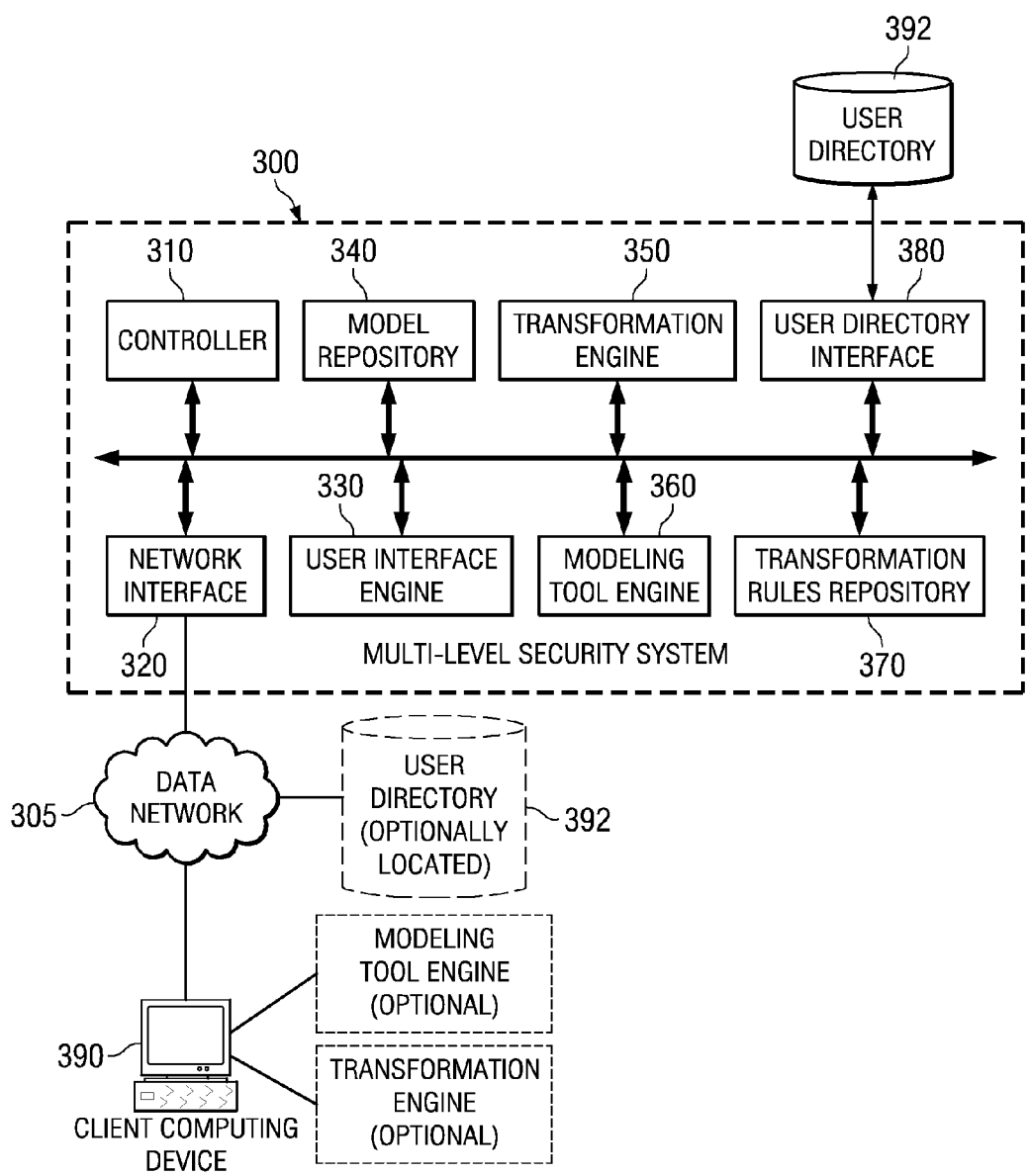
FIG. 3 is an exemplary block diagram of the primary operational elements of a multi-level security aware modeling system in accordance with one illustrative embodiment.

FIG. 3 is an exemplary block diagram of the primary operational elements of a multi-level security aware modeling system in accordance with one illustrative embodiment. As shown in FIG. 3, the multi-level security system 300 comprises a controller 310, a network interface 320, a user interface engine 330, a model repository 340, a transformation engine 350, a modeling tool engine 360, a transformation rules repository 370, and a user directory interface 380. The elements 310-380 shown in FIG. 3 may be implemented in software, hardware, or any combination of software and hardware. In one illustrative embodiment, the elements 310-380 are implemented as software instructions executed by one or more data processing devices.

The controller 310 controls the overall operation of the multi-level security system 300 and orchestrates the operation of the other elements 320-380. The network interface 320 provides a communication interface through which the multi-level security system 300 may communicate with one or more client computing devices 390 via one or more data networks 305. Access requests from users, other user input, and responses to user input may be received/sent via the network interface 320. The user interface engine 330 provides the necessary user interfaces for receiving input from users of client computing devices 390 as well as providing results of processing of the user input to the client computing devices 390.

The model repository 340 provides a secure storage in which architecture and systems engineering models of organizations and systems architecture may be stored. The models in the model repository 340 preferably comprise elements having associated security characteristic attributes that identify the minimum security level required by a user to obtain access to information about the element. The models may be defined using the modeling tool engine 360 in a manner generally known in the art. In addition to the known mechanisms for defining an architecture and systems engineering model, the mechanisms of the illustrative embodiments further provide an interface via the modeling tool engine 360 for defining a security characteristic attribute for the elements used in the model. For example, a user interface may be provided through which a user may select one of a number of predefined security levels for association with the element, such as via a property sheet or the like. The security level may then be used to generate the security characteristic attribute for the element which is stored in association with the model.

The transformation engine 350 provides the logic for performing transformations of models based on security level. The transformation engine 350 may operate on models defined and stored in the model repository 340 to modify the model to either obscure or eliminate elements based on security level of a user. As discussed above, the transformation engine 350 may compare the security level of a user sending a request for access of a model with security characteristic attributes of elements in order to identify which elements and their associated relationships with other elements need to be modified by obscuring or hiding the elements that have a higher security level than that of the user. The manner by which the modification is performed may be defined by the transformation rules stored in the transformation rules repository 370.

With the multi-level security system 300, a user of a client computing device 390 may send a request to access a model in the model repository 340 to the multi-level security system 300 via the data network 305 and the network interface 320. The controller 310 may then retrieve the model from the model repository 340 and provide the model to the transformation engine 350 along with user security level information for the user obtained from a user directory 392 via the user directory interface 380. For example, based on a user log-on operation with the multi-level security system 300, a user may be authenticated by the controller 310 and corresponding user security level information may be retrieved from the user directory 392, e.g., a LDAP directory, via the user directory interface 380. The user directory 392 may be located local to the multi-level security system 300 or may optionally be accessible via the one or more data networks 305.

The user security level information may then be used by the transformation engine 350 along with the model information to identify which elements in the model need to be obscured or hidden/removed in a modified model. As mentioned above, the determination of which elements need to be obscured or hidden/removed may be determined by an analysis of the actual instances of element types supported by the modeling language used to define the model. The result may be a data structure identifying the actual relationships between elements as well as other information about the elements including their containment, hierarchy, and other architectural or structural characteristics of the original model. This data structure may be used along with other data structures specifying the kinds of relationships that may occur between various model element types supported by the modeling language and data structures specifying a desired strategy for replacing relationships between model elements based on selection of a desired representation mode.

That is, a first data structure is provided that specifies the kinds of relationships that can occur between the various modeling language element types supported by the modeling language. Each of these relationships in the first data structure has an associated unique identifier that may be referenced by replacement/transformation strategies specified in a second data structure. Thus, the first data structure has, for each pairing of model element types, one or more relationship types with unique identifiers for identifying each relationship type that applies to that pair of model elements. The second data structure specifies a desired strategy for replacing relationships between model elements, based on a user selection of a desired representation mode, e.g., hidden or removed, for the modified versions of the model, as determined by a unique identifier corresponding to the relationships defined in the first data structure. Thus, in one illustrative embodiment, the second data structure specifies the way in which a relationship between two model elements should be modified or replaced if one of the elements is to be hidden or removed based on the permissible relationships specified in the first data structure.

The first and second data structures may be general in nature such that they apply to all transformations of an original model and may in fact apply to various different models generated using the same modeling language. A particular original model may be analyzed to determine the various instances of the model element types. These instances of model element types may be used to generate a third data structure. That is, the third data structure may be generated by traversing the original model and identifying the actual relationships between model elements, their containment, hierarchy, and other architectural or structural characteristics of the original model. Using these data structures, transformation rules may be established for transforming model elements and/or their relationships with other model elements in the original model into a modified model based on security characteristics and user security levels. These transformation rules may be stored in the transformation rules repository 380. The transformation rules may be used by the transformation engine 350 along with the various data structures to determine how to modify the model such that information about model elements that have a security characteristic indicative of a user not being able to access information about that model element is obscured or removed from a modified model and thus, the representation of the modified model through the modeling tool engine 370. The obscuring or hiding/removal of elements from the original model in generating the modified model may further require the obscuring or removal of relationship representations of the obscured or hidden/removed element with other elements with which a relationship was present in the original model, as discussed in greater detail below.

Thus, based on the security characteristics of the elements in the model and the security level of the user of the client computing device 390 attempting to access the model, the content of the model, i.e. the elements, their connections, and other information within the model, may be dynamically modified by application of the transformation rules such that elements that are not accessible by a user having that security level are obscured or not visible to the user. Moreover, the other elements of the model which are accessible by the user based on his/her security level are modified in the dynamically modified model so as to not provide information that would disclose the nature, character, or in some cases even the presence, of the elements that are not accessible by the user based on his/her security level. In this way, a customized architecture and systems engineering model may be dynamically obtained from a defined model based on security levels of users accessing the defined model.

Alternatively, various versions of the architecture and systems engineering model may be generated for the various supported security levels. For example, an original model may be defined that includes objects, packages, and/or other elements/constructs of an architecture and systems engineering model that have associated security characteristics of various security levels. From this original model, a first version of the model may be generated for a first user security level, or below, by transforming the original model into a customized model for the first user security level. Similarly, a second version of the model may be generated for a second user security level. The various versions of the original model may be stored in a secured system, e.g., the model repository 340, and may be retrieved based on the determined security level of the user requesting access to the original model.

Moreover, as shown in FIG. 3, some or all of the elements of the multi-level security system 300 may be provided on the client computing device 390 itself. In the depicted example, the modeling tool engine and transformation engine may be provided on the client computing device 390. In such an embodiment, the model information may still be stored in a secured repository accessible via the multi-level security system 300 with the functions of the modeling tool engine and the transformation engine described above being performed on the client computing device 390 based on information sent to the client computing device 390 from the multi-level security system 300.

FIG. 4 is an exemplary diagram of a general model element type relationships table data structure in accordance with one illustrative embodiment. As shown in FIG. 4, the general model element type relationships table data structure 400 is an N×N×M table data structure of all the combinations model element types that are supported by the modeling language used to generate the original model, where N is a number of different element types and M is a maximum number of different relationship types between any two element types (rows/columns with elements in the rows being source elements and elements in the columns being target elements, or vice versa; thus a source/target combination (type1, type2) may have a different relationship than the source/target combination (type2, type1)). That is, every model element type may have many different relationship types between other model elements. For example, a class can be associated with another class, can have a dependency, and may have inheritance relationships, etc. Similarly, other model element types may have many different relationships with other model elements as well. Each of these pairings of model element types and their corresponding relationship types may be represented in the general model element type relationships table data structure 400. This general model element type relationships data structure 400 may be general such that it applies to many different models stored in the model repository or may be specific to a particular model.

The general model element type relationships table data structure 400 includes a plurality of cells 410 which each store one or more relationship types 420 specifying the permissible relationships between model element types 430 and 440 specified in the row and column corresponding to the cell. The definition of these relationships may be defined by the particular modeling language and systems architecture framework, e.g., UML in a UPDM framework, used to generate the original model. Of course, a privileged user may modify these relationships as they deem necessary for implementation of desired operations of models using the modeling language and systems architecture framework.

As an example, the permissible relationships between a model element of type 1 with other model elements of type 1 includes an association relationship and a dependency relationship. As a further example, a permissible relationship between a model element of type 2 with model elements of type 3 is a dependency relationship. Each of these relationships has an associated unique relationship identifier (RID) that may be used by other data structures to reference the particular relationships within the general model element type relationships table data structure 400.

It should be appreciated that FIG. 4 shows multiple relationship types being able to be stored in each cell for purposes of clarity of the depiction, however, as mentioned above the table data structure may be an N×N×M table data structure where M represents the maximum number of different types of relationships between any two model element types such that each cell may have only one relationship type in it. As a result, the RID may be associated with a particular cell in the table data structure 400.

FIG. 5 is an exemplary diagram of a relationship replacement table data structure in accordance with one illustrative embodiment. The relationship replacement table data structure 500 includes cells for representing the relationship replacement or substitution options for relationships in the general model element type relationships table data structure 400 in the event that one of the model elements in the pairing in the general model element type relationships table data structure 400 has a security characteristic attribute indicating that a particular user does not have a sufficiently high security level to access the model element. Each cell 510 in the relationship replacement table data structure 500 corresponds to a particular RID in the general model element type relationships table data structure 400 combined with a selection of a replacement mode for the transformation engine.

In the depicted example, the possible replacement modes include a 'black box' replacement mode 520 and a "hidden" replacement mode 530. In the 'black box' replacement mode 520, model elements that cannot be accessed by a particular user based on security level comparisons, are replaced with "black boxes" in the modified model and the representation of the modified model. The "black boxes" do not provide any information about the actual element that they are replacing or the specific type of relationship between that "black box" and other elements within the modified model. Moreover, in a representation of the element in a modeling tool, the black box is not selectable by a user for editing or obtaining of information about the characteristics of the black box. Thus, the black box merely provides evidence of the existence of an element, but no specific information about what the element might be.

The "hidden" replacement mode 530 completely hides elements for which a user does not have a sufficient security level to access the elements. Thus, with a "hidden" replacement mode 530 the element itself is removed from the model and thus, the representation of the model in a modeling tool, and relationships with that removed element are replaced or substituted in the manner set forth in the relationship replacement table data structure 500.

For example, for an RID of 2.1.1., which corresponds the inheritance relationship between a model element of type 1 and a model element of type 2 in the general model element type relationships table data structure 400, two different replacement/substitution options are available depending on the type of replacement mode selected for the original model. If a "black box" replacement mode is selected, and a relationship of the element corresponds to RID 2.1.1, then the relationship in the modified model between the element that is obscured by replacement with a "black box" and another element with which the original relationship is an inheritance relationship, is also an inheritance relationship. However, if a "hidden" replacement mode is selected, the original inheritance relationship is replaced with the removal of the element itself and removal of all elements that are dependent (i.e. have an inheritance relationship with the element in question) on the element in question. This is because in a "hidden" replacement mode, the element is removed or hidden in the modified model and thus, one cannot have dependent elements having relationships with an element that is either not present or not visible in the modified model.

The combination of the data structures 400 and 500 may constitute a security policy for the original model. That is, the data structure 400 specifies the permissible relationships between model elements and the data structure 500 specifies the manner by which the model's relationships between model elements are to be modified in the event that a user does not have a sufficient security level.

FIG. 6 is an exemplary diagram of an actual model element relationships table data structure in accordance with one illustrative embodiment. The actual model element relationships table data structure 600 may be generated by analyzing the original model to identify the specific instances of model element types and their relationships with other instances of the same or different model element types. In one illustrative embodiment, the model may be defined as one or more XML documents or other structured document. This XML or other structure document may be parsed to identify definitions of model element type instances and their relationships with other model element type instances. This information may then be used to populate the actual model element relationships table data structure 600.

As shown in FIG. 6, the actual model element relationships table data structure 600 comprises a plurality of cells 610 in which relationship information is specified for a particular combination of instances of model element types 620 and 630 in the original model. That is, given a modeling language, such as UML, a programmer may create a specific model with many elements, groups of elements, and the like. The model may represent any type of system, organization, enterprise, or the like. For example, the model may be a model of a software system, a satellite, or the like. The table data structure 600 encodes the specific relationships used in that defined model. It is possible that there may be multiple relationships of the same or different types between two model elements based on what the programmer is attempting to model. For example, there can be two communication paths between two nodes, one for wireless and one for Ethernet. Wireless and Ethernet are differentiated by attributes, but the type of the link is a communication path.

In addition to the relationship information, the security characteristic attributes of the instances of the model element type are also shown in FIG. 6, although this information may not actually be present in the table data structure 600 but is accessible through the data structures, structured documents, or the like, defining the model itself. For example, a particular instance of model element type 2, with a security characteristic attribute of "top secret", has a "communication" relationship with an instance of model element type 1, which has a "secret" security characteristic attribute (see second column, first row of FIG. 6). This means that the instance of model element 2 may communicate with the instance of model element 1 in the original model and vice versa. Similarly, there is an inheritance relationship between another instance of the model element type 1 and an instance of the model element 2 (see first column, second row of FIG. 6).

In looking at the table data structure 600 of FIG. 6, it should be noted that the exemplary convention used is that i) some of these relationships are bi-directional, each model elements refers to the other via the relationship; and ii) some of the relationships are uni-directional. For encoding purposes, it is assumed that the left side of the table data structure's modeling elements "point" to the top modeling elements. The transform/generation engine, described hereafter, contains logic that knows each relationship type's semantics so that it can manipulate the model in terms of the programming environment that it is running in, for example, java, eclipse, or the like.

Thus, the data structure 600 specifies the relationships between actual model elements within the original model. The data structure 400 specifies the permissible relationships between model element types and provides unique identifiers for these different relationships. The data structure 500 provides the replacement/substitution rules for the various relationships in data structure 400 based on a selected replacement mode. Thus, by parsing the model or the data structure 600 and comparing a user security level with the security characteristic attribute of the instances of the model element types, the mechanisms of the illustrative embodiments may identify which instances of model element types must be obscured or hidden in a modified model. These instances of model element types may then be correlated with the model element types in the data structure 400 to identify the particular RID for the relationships between the instances of the model element type and other instances of model element types in the original model. These RIDs may then be used to look up a replacement/substitution rule in the data structure 500 based on the currently selected replacement mode for the model, which may be an attribute stored in association with the model data structures, structured documents, or the like.

Based on the replacement mode and the replacement/substitution rule identified through the above process, the instances of model element types for which the user does not have sufficient security level access, may be obscured or removed/hidden in a modified model. This modified model may then be provided to the user via his/her client computing device. Alternatively, these operations may be performed within the client computing device in order to modify the model before presentation to the user via a graphical display and a modeling tool running on the client computing device.

The transformation of the original model to the modified model may be performed entirely based on the data structures described above with regard to FIGS. 4-6. In this sense, the data structures in FIGS. 4-6 may constitute the set of transformation rules for transforming the original model to a modified model based on user security level and security characteristic attributes of the model elements. Alternatively, the transformation rules may be specified in a formal language, such as XSLT, XPATH, or the like, and these transformation rules may be used in replace of, or in combination with, the data structures in FIGS. 4-6. Thus, transformation rules may be specified as one or more transformation algorithms that may be run on an original model and which may use the data structures of FIGS. 4-6 to perform the transformation of the original model to a modified model that is customized for the particular security level of a user requesting access to the original model. Such operations may be performed dynamically in response to a user request, or may be performed prior to a user request, to access the original model.

FIG. 7 is an exemplary diagram of a set of transformation rules for a first type of relationship between model elements in accordance with one illustrative embodiment. In the notation of FIG. 7, the term "U1" refers to a user, "M1," "M2,"... "MN," are model elements, "G1," "G2,"... "GN" are groups of model elements (e.g., containers, packages, folders, diagrams, etc.), "=" means "equals," "→" means "implies," and "//" signifies a comment. The transformation rules/algorithm shown in FIG. 7 is for a relationship between elements M1 and M2 or for a relationship between elements typed by M1 and M2, respectively.

The transformation rules are applied to pairs of model elements M1 and M2. As shown in FIG. 7, in the case that the user U1 has sufficient security level and the security characteristic attributes (referred to in the figure as a "security label") of the model elements are the same, there is no change to the model. In the case where the user U1 has sufficient security level and the security characteristic attributes of the model elements differ, there is no change to the model as long as the user has sufficient security level for both model elements. In the case where the user has sufficient security level for one of the model elements but not the other of the model elements, a replacement strategy must be implemented, such as defined in data structure 500 of FIG. 5, for example.

In the particular rule shown in FIG. 7, if the replacement mode is a "black box" replacement mode, then the model element M2 is replaced with a black box representation but its links to M1 are preserved. If a "hidden" replacement mode is selected, for each element K that the model element M2 has a relationship with, a lookup operation is performed in the data structures 400 and 500 to determine if a link between M1 and K may be made and if so, the model may be updated with a link between the model element M1 and K. Thus, in other words, the RIDs of the relationships of M2 are looked up in the data structure 500 and are replaced, according to the replacement mode, with the relationship types specified in the data structure 500 such that M1 is now linked with K in the manner specified by the replacement relationship in data structure 500. The model element M2 may then be removed from the model and thus, the model representation that would be generated by the modeling tool on either the secure repository server or the client computing device.

FIG. 8 is an exemplary diagram of a set of transformation rules for a second type of relationship, in which the model element is a stand-alone model element, in accordance with one illustrative embodiment. The transformation rules or algorithm shown in FIG. 8 provide a simple straight forward way of modifying a stand-alone model element in the event that the stand-alone model element has a higher security characteristic attribute than the security level of the user requesting access to the model. The transformation rule/algorithm of FIG. 8 may be summarized as, if the user has a sufficiently high security level, do not change the model; otherwise, replace the model element M1 with a black box if the black box replacement mode is selected or remove the model element M1 from the model if a hidden replacement mode is selected.

FIG. 9 is an exemplary diagram of a set of transformation rules for a third type of relationship, in which groups of model elements are contained, in accordance with one illustrative embodiment. As shown in FIG. 9, the transformation rules/algorithm if the user has a sufficiently high security level for accessing the group of model elements, then there is no change to the group within the model. However, each individual model element within the group must itself be checked as well using the transformation rules/algorithms shown in FIGS. 7-9 depending on the particular case. This is depicted in FIG. 9 with the statement "Recursive: Apply Case 1, Case 2, or Case 3 on K"

If the user does not have sufficient security level access for the group, either of the transformation rules/algorithm in FIG. 7 or 8 are applied to the group as a whole, i.e. the group is considered the model element M2 in the rules/algorithm in FIG. 7 or 8. In this way, the group as a whole may be replaced with a black box or removed entirely with appropriate modifications to any links the group may have had to other model elements within the model. It should be noted that in the black box transformation, relationships must be drawn from the blackbox to outside elements (again testing each relationship for security level access).

In the hidden transformation case, the transformation may be made very simple or more complex. For example, in a simple implementation, all relationships to/from elements in the group may be removed. In a more complex implementation, relationships between visible elements that are indirectly related by relationship with one or more elements in the group may be maintained. For example, suppose a visible element A has a relationship to group element G1. G1 is linked to G2 and G2 is linked to a second visible element B. The determination is whether the transformed model should have a link from element A to element B. As a further complication, if G1 also has a link to G3 which has links to elements C and D, the determination would further be whether element A should have links with elements B, C, and D. Each of the links between elements in the group G1 and any other group/element may be checked in a recursive manner in order to determine if any links should be maintained between the elements which are linked to group G1 and other elements/groups that the group G1 elements are linked to.

Such processing may be quite complex and time consuming and thus, in some cases it may be more beneficial to utilize the simple implementation.

The transformation rules of FIGS. 7-9, as well as the data structures of FIGS. 4-5, may be stored in the transformation rules repository 370 of FIG. 3, for example. The data structure 600 of FIG. 6 may be generated based on a model retrieved from the model repository 340 in FIG. 3 and stored in a memory or storage associated with the transformation engine 350. The transformation engine 350 may implement the transformation rules/algorithms of FIGS. 7-9 on the model information stored in the data structure 600 of FIG. 6 and may use the data structures 400 and 500 in FIGS. 4 and 5 to apply these transformation rules/algorithms to the model information. The resulting modified model may be provided to the modeling tool engine 360 for use in providing a user interface to the client computing device from which a user's request for access to the original model was received. Alternatively, the modified model may be transmitted to the client computing device which itself may run the modeling tool and may represent the modified model to the user.

It should be noted that while the above description of the illustrative embodiments only makes reference to two different types of replacement modes, the present invention is not limited to such. Rather, other replacement modes, other than black box and hidden, may be used in addition to, or in replacement of, the replacement modes discussed above. If additional replacement modes are supported in a particular implementation of the present invention, then the table data structure 500 in FIG. 5 would be expanded to include these additional replacement modes. Moreover, additional replacement mode options may be provided to a privileged user when storing the original model so as to allow them to select one of these additional replacement modes for application to the model. Appropriate data for specifying the replacement mode may be stored in conjunction with the data structures defining the original model.

Moreover, while the illustrative embodiments have been described in terms of a single replacement mode being designated for application to any replacement of model elements in an original model, the present invention is not limited to such. Rather, as mentioned above, the particular replacement mode may actually be determined in a dynamic manner based on the security level of the user and a difference between that security level and a required security level for accessing the model element. Thus, if a "top secret" security level is required and the user has a "secret" security level, then the model element may be replaced using a black box replacement mode whereas a user with a "confidential" or "unclassified" security level may cause the model element to be replaced using a "hidden" replacement mode. Such dynamic determination of the replacement mode may be performed by the transformation engine and may be performed on a model element by model element basis.

Figure 10A:
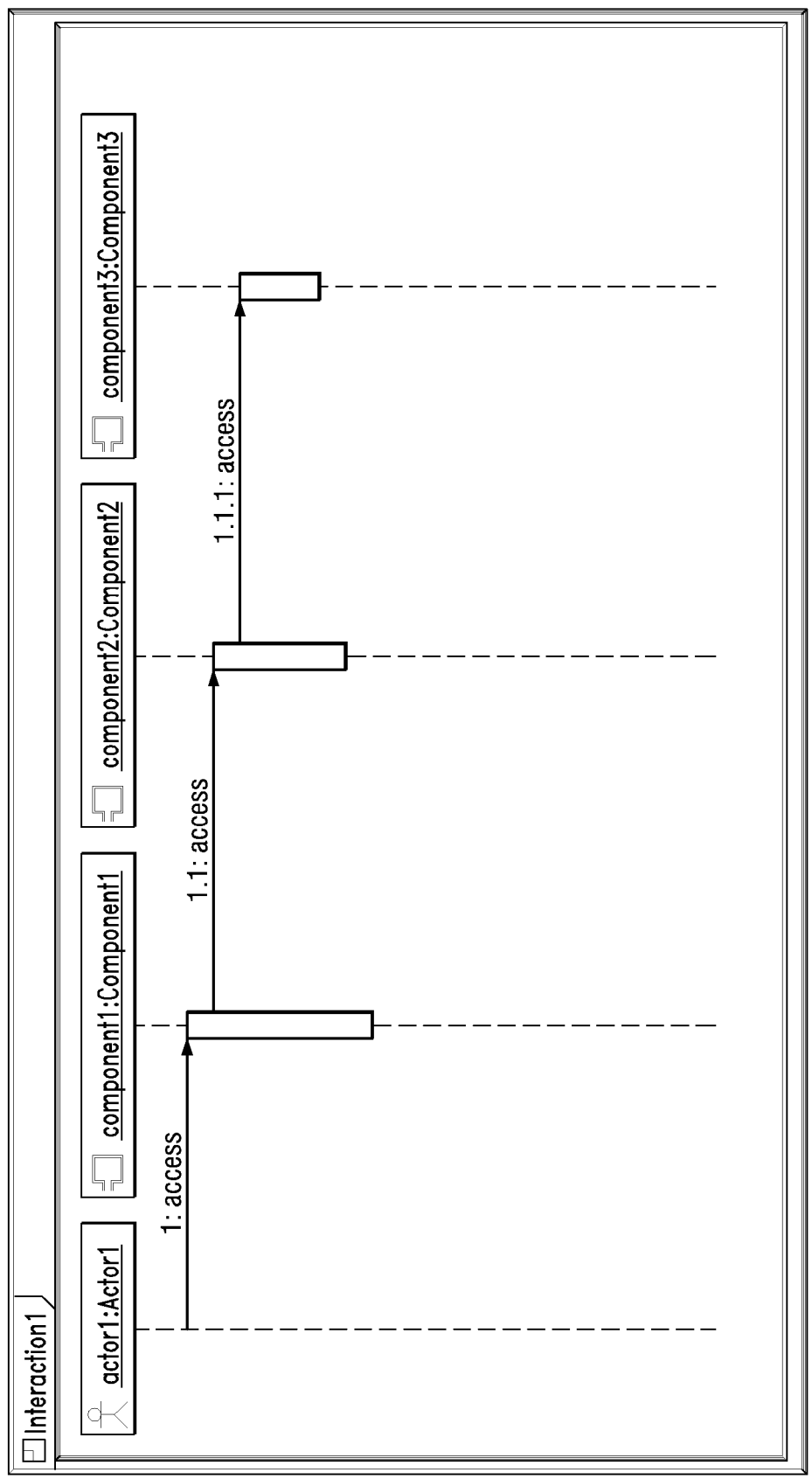
FIGS. 10A-10C are exemplary diagrams illustrating different views of a sequence diagram in accordance with one illustrative embodiment.
Figure 10B:
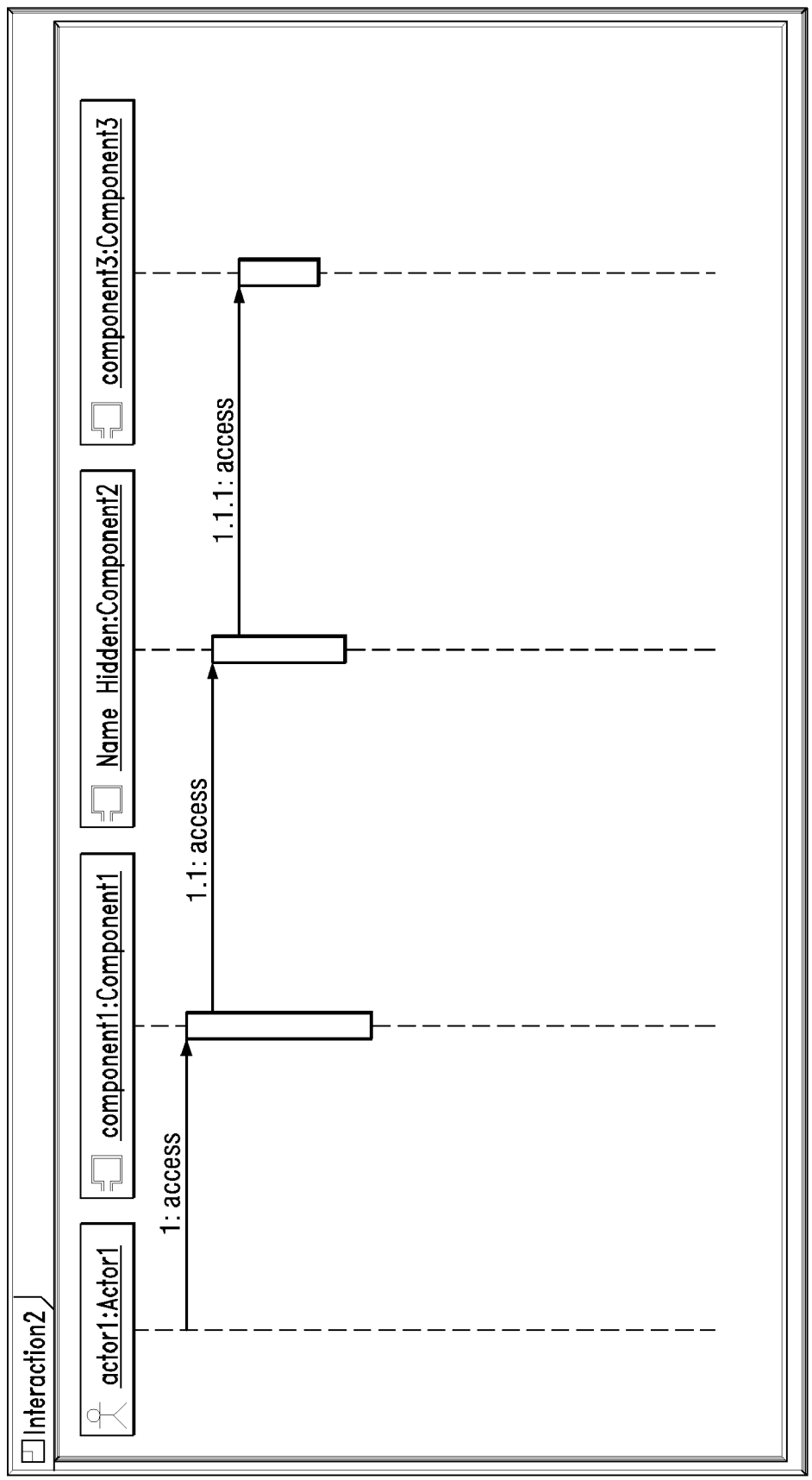
Figure 10C:
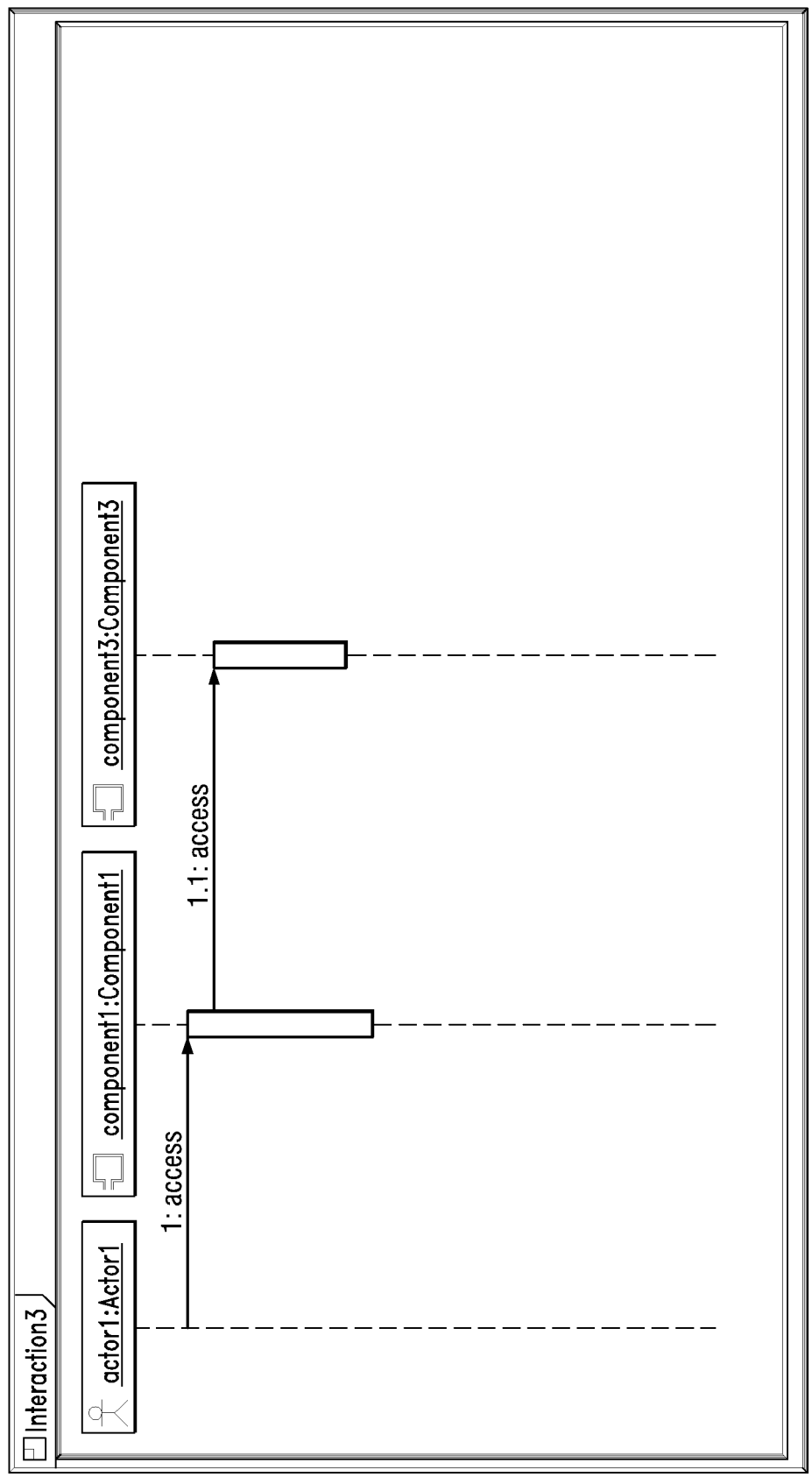

FIGS. 10A-10C are exemplary diagrams illustrating different views of a sequence diagram in accordance with one illustrative embodiment. FIG. 10A represents a sequence diagram that may be generated for an original model in which all model elements are visible in the representation. All of the model elements are visible in this view since there is no filtering or modification based on user security level. With this view, there is no restriction on the user's ability to modify the links between model elements or obtain information about the various model elements. Such a view may be provided, for example, to a privileged user or even to a user who has a sufficient security level to view all of the model elements within the model.

FIG. 10B is an exemplary view in which a model element has been hidden through operation of the mechanisms of the illustrative embodiments. As shown in FIG. 10B, "component 2" has been renamed in this view, thereby essentially replacing "component 2" with a "black box." In this view, the user is not able to know the real name of "component 2." However, the user is still able to modify links between the various model elements, i.e. components 1-3. Thus, only the identity and information about the model element replaced with the "black box" is obscured using this view. This view may be provided in situations where it is desirable to permit the user to know that a model element exists but needing to obscure the specific information for the model element, such as in the dynamic determination of replacement mode embodiment described previously.

FIG. 10C is an exemplary view in which a model element is completely removed/hidden in the modified model. In this view, component 2 has been completely removed from the view and the links between model elements, i.e. component 1 and component 3 are updated so that there is no evidence that component 2 is in existence. Since there is a hidden component between component 1 and component 2, the user is not permitted to change the link between components 1 and 3 in this view since doing so might negatively impact the hidden component. However, the user is able to access all other information about the displayed model elements and make edits to the displayed model elements as long as they do not conflict with or negatively impact the presence of the hidden model element.

It should be noted that some model elements can be locked independent of the security level such that they, and their relationships, cannot be edited. Alternatively, a user may be allowed to edit the model elements and their relationships, but when submitted, a workflow/governance/review process, which may be automated or manual, may resolve whether the user is permitted to make the changes submitted based on security information. If the user is not permitted to make the changes submitted, an error indication may be returned indicating that they were not allowed to change the model in the manner specified. This error indication preferably does not provide any specific indication of where the error occurred so that the user is not informed of where a hidden element may be present.

Figure 11A:
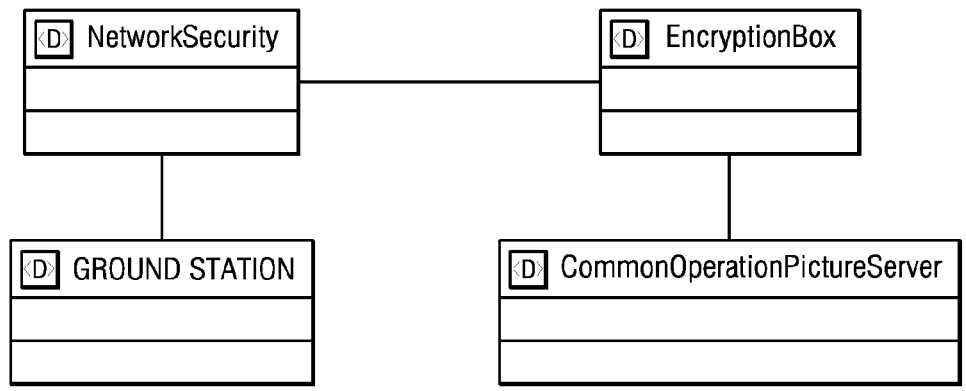
FIGS. 11A-11B are exemplary diagrams illustrating different views of a deployment diagram in accordance with one illustrative embodiment.
Figure 11B:
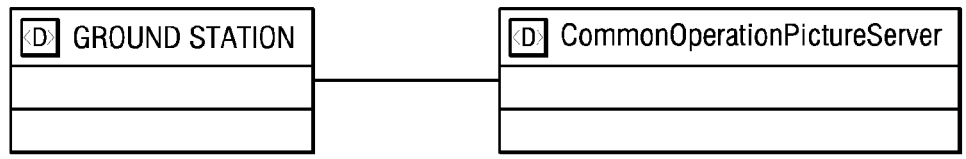

FIGS. 11A-11B are exemplary diagrams illustrating different views of a deployment diagram in accordance with one illustrative embodiment. FIG. 11A, similar to FIG. 10A, shows a deployment diagram that would be generated using the original model and a highest level of security, i.e. that of a privileged user that may have generated the model. As shown in FIG. 11A, the deployment diagram shows a ground station 1110, a network security entity 1120, an encryption box entity 1130, and a common operation picture server 1140. The network security entity 1120 and encryption box entity 1130 may be sensitive elements of the systems architecture to which not all users should have access or even be made aware of their existence. Thus, a security characteristic attribute 1112 of the ground station 1110 and security characteristic attribute 1142 of the common operation picture server 1140 may be set to "unclassified" while the security characteristic attributes 1122 and 1132 of the network security entity 1120 and encryption box entity 1130 are set to "secret."

As shown in FIG. 11B, if a user having only "unclassified" security level access were to attempt to view the model shown in FIG. 11A, through the mechanisms of the illustrative embodiments, the model may be modified to remove model elements that the user does not have sufficient security level to access. Thus, in the modified model deployment diagram shown in FIG. 11B, the network security entity 1120 and the encryption box entity 1130 have been removed with a link between the ground station 1110 and the common operation picture server 1140 being used to replace the links between the elements 1110, 1120, 1130, and 1140. In this way, the user is not informed of the existence of elements 1120 and 1130 and furthermore is not able to obtain any information about these elements 1120 and 1130 or edit them. Moreover, the user may be prevented from modifying the linkage between the ground station 1110 and the common operation picture server 1140 in the modified model deployment diagram in order to avoid negatively impacting the hidden elements 1120 and 1130.

Figure 12:
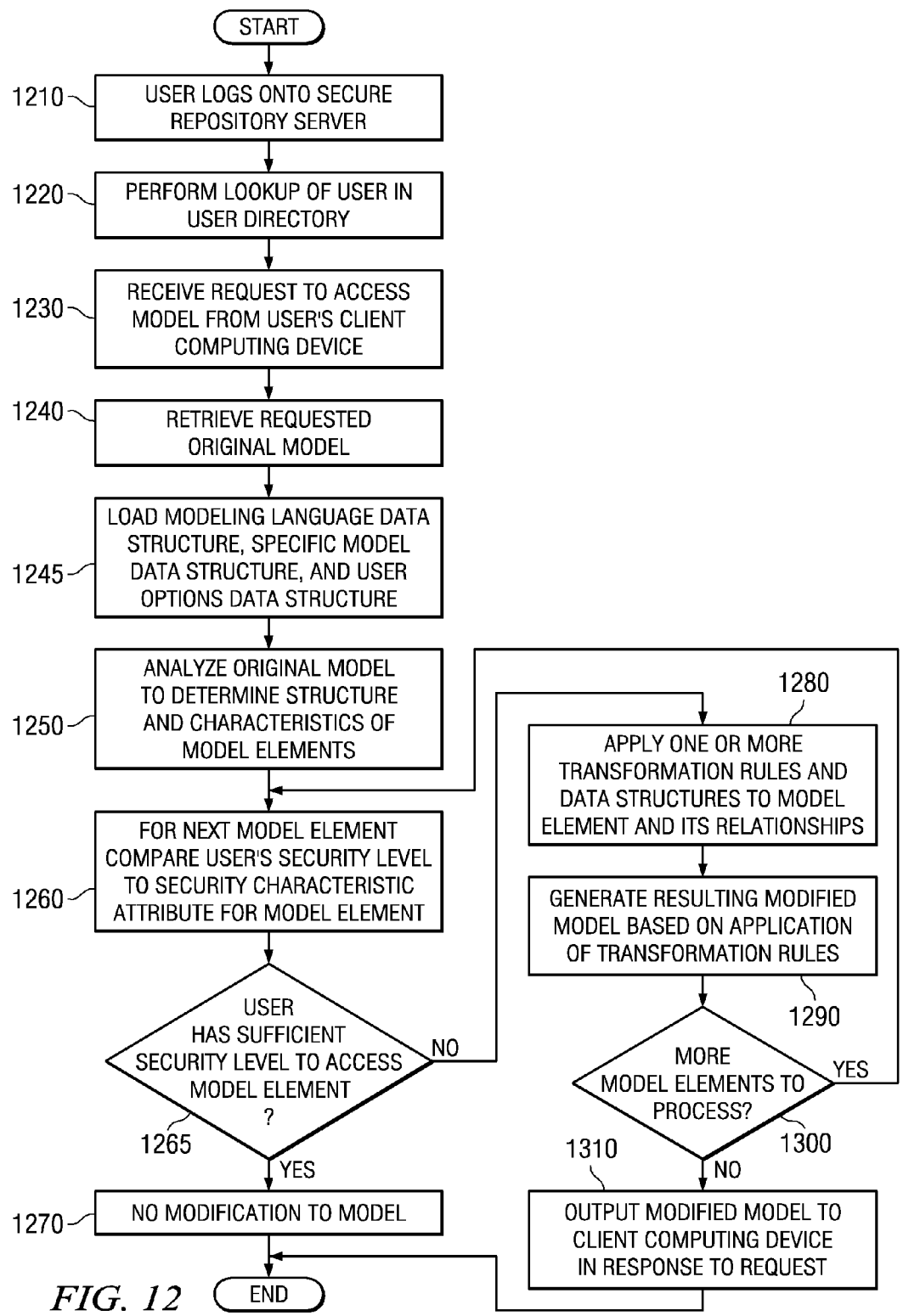
FIG. 12 is a flowchart outlining an exemplary operation for customizing a model based on a user's security level and security characteristics of the elements of the model, in accordance with one illustrative embodiment.

FIG. 12 is a flowchart outlining an exemplary operation for customizing a model based on a user's security level and security characteristics of the elements of the model, in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 12, the operation starts with a user logging on to the secured repository server (step 1210). Based on the user log-on information, lookup operation is performed in a user directory to authenticate the user and to retrieve the user's security level (step 1220). A request for accessing an original model is received from a client computing device associated with the user (step 1230). The model is retrieved from a model repository (step 1240) and the modeling language data structure, the specific model, and user options data structures are loaded (step 1245). The model is analyzed to determine its structure, i.e. the model element type instances, their relationships, containment, security characteristic attributes, and the like (step 1250).

For a next model element in the original model, a comparison of the user's security level to the security characteristic attribute of the model element is performed (step 1260) and a determination is made as to whether the user has a sufficient security level to access the model element (step 1265). If the user has a sufficient security level for accessing the model element, no change to the model is performed (step 1270). If the user does not have a sufficient security level for accessing the model element, one or more transformation rules are applied to the model element based on a selected or dynamically determined replacement mode (step 1280). The one or more transformation rules are applied to the model element and its relationships to either obscure or remove/hide the model element and modify the model element's relationships in accordance with a replacement/substitution strategy specified in the transformation rules and/or the transformation rules data structures. A resulting modified model is generated based on the application of the transformation rules to the model element (step 1290).

A determination is made as to whether there are more model elements to be processed (step 1300). If so, the operation returns to step 1260. Otherwise, the modified model is output to the client computing device a the model requested by the client computing device (step 1310). The operation then terminates.

Thus, the illustrative embodiments provide a system and method for multi-level security filtering of model representations. With the system and method of the illustrative embodiments, elements of an architecture and systems engineering model have associated security characteristics identifying the required level of security that a user must have in order to be able to obtain access to information about that element of the model. Based on these security characteristics and the security level of a user attempting to access the model, the content of the model, i.e. the elements, their connections, and other information within the model, is modified such that elements that are not accessible by a user having that security level are obscured or not visible to the user. Moreover, the other elements of the model which are accessible by the user based on his/her security level are modified in the modified model so as to not provide information that would disclose the nature, character, or in some cases even the presence, of the elements that are not accessible by the user based on his/her security level. In this way, a customized architecture and systems engineering model may be dynamically obtained from a defined model based on security levels of users accessing the defined model.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for modifying an original model based on a security level of a user, comprising:
   receiving a user request for access to the original model;
   identifying a security level associated with the user;
   comparing the security level of the user with security characteristic information of one or more model elements within the original model;
   modifying the original model based on results of the comparison and application of one or more transformation rules, to model elements and their relationships in the original model, for transforming the original model into a modified model based on the security level of the user; and
   presenting the modified model to the user in response to the user request for access to the original model.

2. The method of claim 1, wherein the original model is a Unified Modeling Language (UML) model generated using the UML profile for DoDAF/MODAF (UPDM) standard.

3. The method of claim 1, wherein modifying the original model based on results of the comparison and one or more transformation rules comprises determining a representation option for the original model, wherein the representation option identifies a manner by which elements in the original model that are transformed by the one or more transformation rules are represented in the modified model, and wherein the modified model has a representation different from a representation of the original model, based on the representation option and the one or more transformation rules.

4. The method of claim 3, wherein the representation option is at least one of a black box representation option or a hidden element representation option.

5. The method of claim 4, wherein in response to a determination that the representation option is a black box representation option, elements of the original model having security characteristic information indicating a required security level higher than the security level of the user are replaced with a black box representation in the modified model that does not provide details of the elements.

6. The method of claim 4, wherein in response to a determination that the representation option is a hidden representation option, elements of the original model having security characteristic information indicating a required security level higher than the security level of the user are removed from a representation of the modified model.

7. The method of claim 6, wherein in response to a determination that the representation option is a hidden representation option, user edits to elements of the modified model coupled, in the original model, to hidden elements in the modified model are prohibited.

8. The method of claim 1, wherein modifying the original model based on results of the comparison and application of one or more transformation rules for transforming the original model into a modified model based on the security level of the user comprises retrieving a previously modified version of the original model associated with the security level of the user in response to receiving the user request for access to the original model, and wherein presenting the modified model to the user comprises presenting the previously modified version of the original model.

9. The method of claim 3, wherein determining a representation option for the original model comprises automatically determining a representation option for each element of the original model based on a determined difference in the security level of the user and a required security level specified in security characteristic information associated with the element.

10. The method of claim 1, wherein presenting the modified model to the user comprises presenting the modified model to the user via a model editing engine, wherein the modified model prevents the user from accessing information about elements of the original model for which the user does not have a required security level, and wherein, via the modified model, the user is able to access information about elements of the original model for which the user has a required security level.

11. A computer program product comprising a computer useable readable storage medium having a computer readable program stored thereon, wherein the computer readable program, when executed on a computing device, causes the computing device to:
   receive a user request for access to the original model;
   identify a security level associated with the user;
   compare the security level of the user with security characteristic information of one or more model elements within the original model;

modify the original model based on results of the comparison and application of one or more transformation rules, to model elements and their relationships in the original model, for transforming the original model into a modified model based on the security level of the user; and present the modified model to the user in response to the user request for access to the original model.

12. The computer program product of claim 11, wherein the computer readable program further causes the computing device to modify the original model based on results of the comparison and one or more transformation rules by determining a representation option for the original model, wherein the representation option identifies a manner by which elements in the original model that are transformed by the one or more transformation rules are represented in the modified model, and wherein the modified model has a representation different from a representation of the original model, based on the representation option and the one or more transformation rules.

13. The computer program product of claim 12, wherein the representation option is at least one of a black box representation option or a hidden element representation option.

14. The computer program product of claim 13, wherein in response to a determination that the representation option is a black box representation option, elements of the original model having security characteristic information indicating a required security level higher than the security level of the user are replaced with a black box representation in the modified model that does not provide details of the elements.

15. The computer program product of claim 13, wherein in response to a determination that the representation option is a hidden representation option, elements of the original model having security characteristic information indicating a required security level higher than the security level of the user are removed from a representation of the modified model.

16. The computer program product of claim 15, wherein in response to a determination that the representation option is a hidden representation option, user edits to elements of the modified model coupled, in the original model, to hidden elements in the modified model are prohibited.

17. The computer program product of claim 11, wherein the computer readable program further causes the computing device to modify the original model based on results of the comparison and application of one or more transformation rules for transforming the original model into a modified model based on the security level of the user by retrieving a previously modified version of the original model associated with the security level of the user in response to receiving the user request for access to the original model, and wherein the computer readable program further causes the computing device to present the modified model to the user by presenting the previously modified version of the original model.

18. The computer program product of claim 12, wherein the computer readable program further causes the computing device to determine a representation option for the original model by automatically determining a representation option for each element of the original model based on a determined difference in the security level of the user and a required security level specified in security characteristic information associated with the element.

19. The computer program product of claim 11, wherein the computer readable program further causes the computing device to present the modified model to the user by presenting the modified model to the user via a model editing engine, wherein the modified model prevents the user from accessing information about elements of the original model for which the user does not have a required security level, and wherein, via the modified model, the user is able to access information about elements of the original model for which the user has a required security level.

20. A system comprising:
a processor; and
a memory coupled to the processor, wherein the memory comprises instructions which, when executed by the processor, cause the processor to:
receive a user request for access to the original model;
identify a security level associated with the user;
compare the security level of the user with security characteristic information of one or more model elements within the original model;
modify the original model based on results of the comparison and application of one or more transformation rules, to model elements and their relationships in the original model, for transforming the original model into a modified model based on the security level of the user; and
present the modified model to the user in response to the user request for access to the original model.

* * * * *